US011092471B2

(12) United States Patent
Krogmann et al.

(10) Patent No.: US 11,092,471 B2
(45) Date of Patent: Aug. 17, 2021

(54) SENSOR ELEMENT AND THERMAL FLOW SENSOR FOR DETERMINING A PHYSICAL VARIABLE OF A MEASUREMENT MEDIUM

(71) Applicant: Innovative Sensor Technology IST AG, Ebnat-Kappel (CH)

(72) Inventors: Florian Krogmann, Kreuzlingen (CH); Patrik Grob, Andwil (CH); Barb Yannick, Ebnat-Kappel (CH)

(73) Assignee: Innovative Sensor Technology IST AG, Ebnat-Kappel (CH)

( * ) Notice: Subject to any disclaimer, the term of this patent is extended or adjusted under 35 U.S.C. 154(b) by 80 days.

(21) Appl. No.: 16/489,118

(22) PCT Filed: Jan. 12, 2018

(86) PCT No.: PCT/EP2018/050734
§ 371 (c)(1),
(2) Date: Aug. 27, 2019

(87) PCT Pub. No.: WO2018/157984
PCT Pub. Date: Sep. 7, 2018

(65) Prior Publication Data
US 2019/0376824 A1 Dec. 12, 2019

(30) Foreign Application Priority Data
Feb. 28, 2017 (DE) .................. 10 2017 104 162.1

(51) Int. Cl.
*G01F 1/692* (2006.01)
*G01F 1/684* (2006.01)
(Continued)

(52) U.S. Cl.
CPC ............ *G01F 1/692* (2013.01); *G01F 1/6845* (2013.01); *G01F 1/698* (2013.01); *G01K 7/18* (2013.01)

(58) Field of Classification Search
CPC ........ G01F 1/6845; G01F 1/692; G01F 1/698; G01F 1/58; G01F 1/68; G01F 5/00; G01K 7/18; H01F 7/06; H01L 21/00
See application file for complete search history.

(56) References Cited

U.S. PATENT DOCUMENTS 6,353,381 B1 3/2002 Dietmann et al.
2002/0023486 A1 2/2002 Watanabe et al.
(Continued)

FOREIGN PATENT DOCUMENTS

DE 102006058425 A1 6/2008
DE 102006060978 A1 7/2008
(Continued)

*Primary Examiner* — Francis C Gray
(74) *Attorney, Agent, or Firm* — Christopher R. Powers; Endress+Hauser (USA) Holding Inc.

(57) ABSTRACT

The present disclosure resides in a sensor element for determining a physical, measured variable of a measured medium, comprising: a planar substrate; a functional layer applied on a surface of the substrate; a passivating layer applied on the functional layer; a metal connecting layer applied on the surface of the passivating layer such that the passivating layer is completely covered; and a metal platelet applied on the surface of the metal connecting layer such that no contact can occur between the passivating layer and the measured medium, as well as residing in a thermal flow sensor, which has at least two such sensor elements.

17 Claims, 2 Drawing Sheets

(51) Int. Cl.
*G01F 1/698* (2006.01)
*G01K 7/18* (2006.01)

(56) References Cited

U.S. PATENT DOCUMENTS

| | | | |
|---|---|---|---|
| 2003/0049877 A1* | 3/2003 | Mayer | G01F 1/6847 |
| | | | 438/48 |
| 2004/0000196 A1 | 1/2004 | Kleinlogel et al. | |
| 2004/0159152 A1* | 8/2004 | Wienand | G01F 1/692 |
| | | | 73/204.26 |
| 2013/0248859 A1* | 9/2013 | Frye | H01L 21/561 |
| | | | 257/48 |
| 2015/0308875 A1* | 10/2015 | Muller | G01F 1/692 |
| | | | 73/204.26 |
| 2016/0195419 A1* | 7/2016 | Hepp | G01F 1/6845 |
| | | | 73/204.23 |

FOREIGN PATENT DOCUMENTS

| | | |
|---|---|---|
| DE | 102007046900 A1 | 4/2009 |
| DE | 102013108099 A1 | 4/2014 |
| DE | 102016116101 A1 | 3/2018 |
| EP | 0447596 B1 | 6/1994 |
| WO | 2004003483 A1 | 1/2004 |
| WO | 2015036207 A1 | 3/2015 |

* cited by examiner

SENSOR ELEMENT AND THERMAL FLOW SENSOR FOR DETERMINING A PHYSICAL VARIABLE OF A MEASUREMENT MEDIUM

CROSS-REFERENCE TO RELATED APPLICATIONS

The present application is related to and claims the priority benefit of German Patent Application No. 10 2017 104 162.1, filed on Feb. 28, 2017, and International Patent Application No. PCT/EP2018/050734, filed on Jan. 12, 2018, the entire contents of which are incorporated herein by reference.

TECHNICAL FIELD

The invention relates to a sensor element for measuring a physical variable of a measured medium. Furthermore, the invention relates to a thermal flow sensor, which has at least two sensor elements of the invention.

BACKGROUND

Known from the state of the art are numerous sensor elements for determining the temperature of a measured medium. Such are manufactured, for example, using thin film technology and are composed of a functional layer of, for example, platinum, on a substrate. By means of this functional layer, the temperature of a medium in thermal interaction with the functional layer can be determined. The measured medium is, in such case, especially a gaseous or liquid fluid.

Thermal flow sensors are typically composed of a plurality of these sensor elements, usually a low-ohm heating element and a high-ohm resistance element, which serves as temperature sensor. Alternatively, thermal flow sensors are composed of a plurality of low-ohm heating elements serving as heaters or temperature sensors.

The functional layer of a sensor element is protected, most often, with passivating layers, for example, of thick film glasses, which typically have a thickness of about 20-30 micrometers.

If one operates the sensor elements, for example, as thermal flow sensors, or temperature sensors, in direct contact with the measured medium, then there occurs, depending on the measured medium, a more or less greatly marked corrosion of the passivating layer of the sensor elements. Such corrosion brings about, in given cases, a significant lessening of the long term stability of the sensor elements.

For this reason, the sensor elements are frequently used in metal sleeves and, in this way, protected from the process medium. The greater thermal mass effected by this practice lessens, however, both the response time of the sensor elements, as well as also their sensitivity, especially for the case, in which the sensor elements are used as heating elements in thermal flow sensors.

SUMMARY

Based on the above, an object of the invention is to provide a sensor element and a thermal flow sensor, which have an improved long term stability.

The object is achieved by a sensor element for determining a physical, measured variable of a measured medium, comprising:

a planar substrate,
a functional layer, which is applied on a surface of the substrate,
a passivating layer, which is applied on the functional metal layer,
a metal connecting layer, which is applied in such a manner on the surface of the passivating layer that the passivating layer is completely covered; and
a metal platelet, which is applied in such a manner on the surface of the metal connecting layer that in the case of a contact of the sensor element with the measured medium no contact occurs between the passivating layer and the measured medium.

A great advantage of the sensor element of the invention compared with known sensor elements is that the sensor element can be operated in direct contact with the measured medium, without the long term stability of the sensor element being degraded. Because of the metal platelet applied on the substrate by means of the connecting layer, only the metal platelet, the connecting layer, and the substrate come in contact with the measured medium, not, however, the passivating layer, or the functional layer. Since the metal platelet and the connecting layer are quite thin, the sensitivity, or the response time, of the sensor element is only slightly degraded.

A preferred further development of the sensor element of the invention provides that between the passivating layer and the metal connecting layer a contact layer is located, which is embodied in such a manner that an applying of the metal connecting layer on the passivating layer is enabled. For example, the contact layer is composed of a nickel-chromium stack (NiCr/Ni), a nickel-chromium-gold stack (NiCr/Ni/Au), a titanium-tungsten-palladium stack (TiW/Pd), a titanium-tungsten-palladium-gold stack (TiW/Pd/Au), or a similar material, or a similar stack of materials.

An advantageous, further development of the sensor element of the invention provides that on those regions of the surface of the substrate, which adjoin the metal platelet applied on the surface of the metal connecting layer, a plastics layer is applied in such a manner that it covers the contact layer for the purpose of preventing contact with the measured medium. In this way, it is achieved that the contact layer is protected from the measured medium at the edges, thus, outwardly exposed surfaces between metal platelet and substrate. In such case, it can also be provided that supplementally the metal connecting layer is covered in the same manner by means of the plastics layer. It can also be provided that when the size of the area of the metal platelet exceeds the size of the area of the contact layer, or of the metal connecting layer, the intermediate space between the overlap of the metal platelet and the underlying substrate is filled with the plastics layer.

In an advantageous embodiment of the sensor element of the invention, it is provided that the metal connecting layer is a solder layer, especially a tin solder layer.

In a preferred embodiment of the sensor element of the invention, it is provided that the metal connecting layer is a sintered layer, especially a silver sinter layer.

In an advantageous embodiment of the sensor element of the invention, the passivating layer is composed of glass. The passivating layer is embodied as a thin film and has especially a thickness of about 25 micrometers.

In a preferred embodiment of the sensor element of the invention, it is provided that the substrate is composed essentially of zirconium oxide, aluminum nitride or aluminum oxide. In the case of application of zirconium oxide, the substrate is, for example, a 3%-, 5%- or 8%-stabilized zirconium oxide substrate.

In an advantageous embodiment of the sensor element of the invention, it is provided that the functional layer is composed at least partially of platinum, nickel, palladium, a metal alloy or a doped material. An example of such a doped material is nickel-palladium or platinum-rhodium. A further example of a material is a nickel-chromium alloy.

In an additional advantageous embodiment of the sensor element of the invention, it is provided that the metal platelet is composed of nickel, a nickel-chromium alloy, a stainless steel or a superalloy, examples of such superalloys are typically Inconel and Hastelloy.

In a preferred further development of the sensor element of the invention, it is provided that the sensor element has terminally on a part of the surface of the substrate, which adjoins the metal platelet applied on the surface of the metal connecting layer, connected with the functional layer, contact pads, to which supply wires are welded, bonded, soldered or electrically conductively adhered, and wherein the sensor element is introduced in such a manner into a support element that the contact pads are located within the support element.

In such case, it is provided that the sensor element has a separation, a so-called "sealing area", between the metal platelet and the contact pads, so that the assembly of the supply wires is possible without danger of short circuiting. In the case of the support element, it is especially a sleeve or a small tube. The cross section of the sleeve or tubelet shaped support element can be, for example, round, rectangular or oval.

In an especially advantageous, further development of the sensor element of the invention, it is provided that the support element is filled completely with a potting compound, so that in the case of a contact of the sensor element with the measured medium no contact occurs between the contact pads, and the supply wires, and the measured medium. Because the sensor element is introduced into the support element sufficiently far that the contact pads are located within support element, the contact pads are completely enclosed by the potting compound. Ideally, the sensor element is inserted sufficiently far into the support element that the "sealing area" is completely enclosed by the potting compound.

The sensor element can then be completely immersed in the measured medium, or be surrounded by the measured medium, without the measured medium damaging sensitive components, for example, the contact pads or the supply wires and without creating electrical short circuits.

In an advantageous embodiment of the sensor element of the invention, it is provided that the potting compound is composed of an epoxide resin, silicone or glass.

In a first variant of the sensor element of the invention, it is provided that the functional layer is embodied as a metal layer with a defined electrical resistance and a defined temperature coefficient for determining the temperature of the measured medium as physical, measured variable based on a measured electrical resistance value. Advantageously, the metal layer has a high resistance.

In a second variant of the sensor element of the invention, it is provided that the functional layer is embodied as a metal layer with a defined electrical resistance and wherein the sensor element is embodied to heat the measured medium at least at times by means of a supplied electrical power. Ideally, the metal layer has a low resistance.

Furthermore, the object is achieved by a thermal flow sensor, which has at least two sensors elements embodied according to at least one of the above embodiments, wherein at least one of the at least two sensors elements serves as heating element for heating the measured medium.

An advantage of flow sensors of the invention is that, due to their manner of construction, they have a high sensitivity, combined with a short response time, since they can be in contact with the measured medium without danger of being damaged, for instance corroded.

BRIEF DESCRIPTION OF THE DRAWINGS

The invention will now be explained in greater detail based on the appended drawing, the figures of which show as follows.

DETAILED DESCRIPTION

Figure 1A:
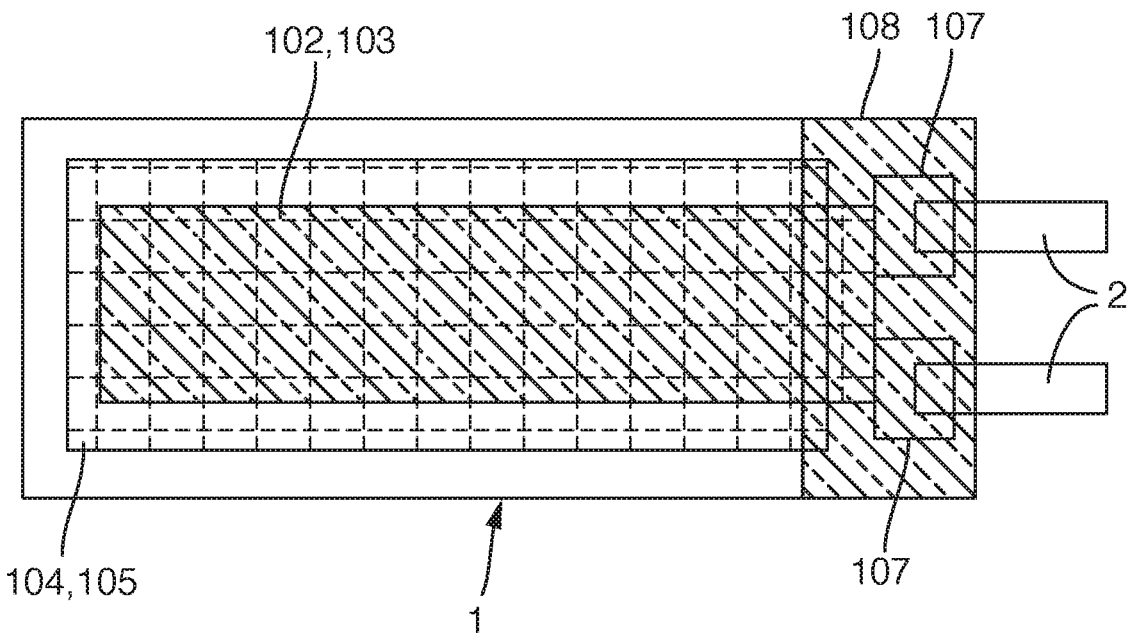
FIGS. 1a and 1b show examples in plan and cross-sectional views, respectively, of a form of embodiment of the sensor element of the present disclosure.
Figure 1B:
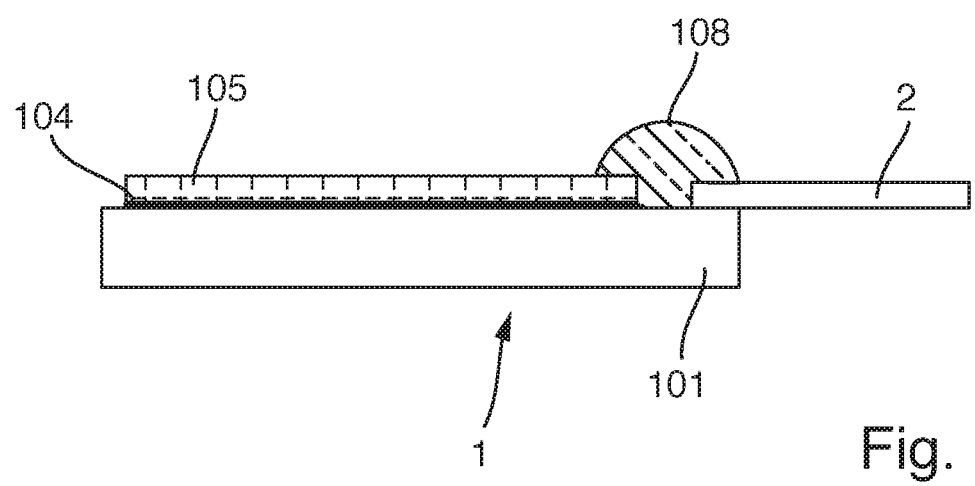

FIG. 1 shows, by way of example, a first form of embodiment of the sensor element 1 of the invention. FIG. 1a shows, in such case, a plan view of the sensor element 1, while FIG. 1b shows a longitudinal cross-section through the sensor element 1.

The sensor element has a substrate 101, which is manufactured essentially of zirconium oxide, aluminum nitride or aluminum oxide, on which by means of thin film technology, for example, by means of vapor deposition or sputtering, a functional layer 102, especially a metal layer, is applied. Since functional layer 102 has only a very small thickness of a few micrometers, such is not visible in the longitudinal cross section shown in FIG. 1b. The functional layer 102 is embodied for determining the temperature of a measured medium, or for heating the measured medium by means of electrical energy. Applied on the functional layer 102 is a passivating layer 103, which is especially composed of glass. Alternatively, the passivating layer 103 can also be a suitable thin film, for example, a layer of $Al_2O_3$, $SiO_2$, $Si_3N_4$ or the like, which typically has a layer thickness in the range from 0.2 μm to 3 μm.

Since the passivating layer 103 runs the risk of corroding upon contact with the measured medium, a metal platelet 105 is applied on the sensor element 1. Such is applied by means of a metal connecting layer 104, especially a tin solder layer, on the layer levels, functional layer 102 and passivating layer 103, and covers these layers 102, 103. It can, in such case, be provided that, such as shown in FIG. 1a, the metal platelet is wider than the functional layer 102, and wider than the passivating layer 103 applied on the functional layer 102. The metal connecting layer 104 covers, in such case, the entire area of the metal platelet 105 facing the substrate 101. In order to make the metal connecting layer 104 adherable to the passivating layer 103, a contact layer is deposited on the passivating layer 103. For example, the contact layer is composed of a nickel-chromium stack (NiCr/Ni), a nickel-chromium-gold stack (NiCr/Ni/Au), a titanium-tungsten-palladium stack (TiW/Pd), a titanium-tungsten-palladium-gold stack (TiW/Pd/Au), or a similar material, or a similar material combination.

For electrical connection of the functional layer 102, contact pads 107 composed of metal layers are provided on a longitudinal end of the substrate. Contact pads 107 are in contact with the functional layer 102. Contact pads 107 and the part of the functional layer 102, which is in contact with the contact pads 107, are not covered by the metal platelet 105. After attachment of supply wires 2 to the contact pads 107, for example, by welding or soldering, the contact pads 107, as well as the joints of the supply wires 2 with the contact pads 107, are sealed by means of a seal 108. The seal 108 is composed especially of glass, epoxy or polyimide.

Because of this construction, the sensor element 1 can be operated in direct contact with the measured medium, without the long term stability of the sensor element 1 being degraded, since only the metal platelet 105, the connecting layer 104, and the substrate 101 come in contact with the measured medium. A corrosion of the passivating layer 103 by contact with the measured medium is prevented.

Figure 2:
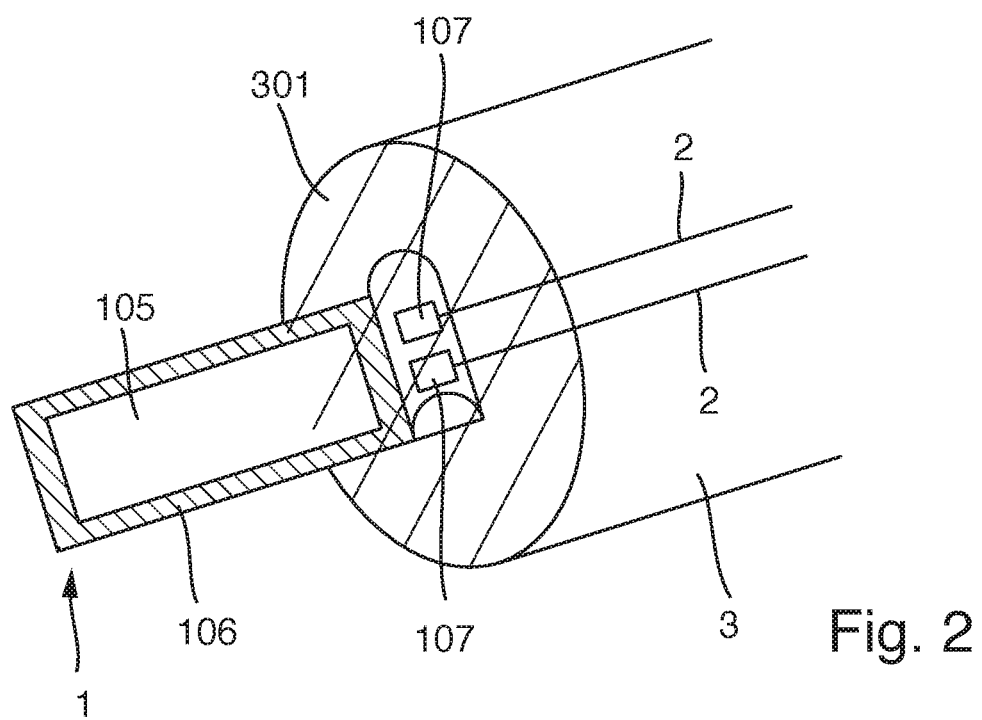
FIG. 2 shows an advantageous, further development of a sensor element of the present disclosure.

FIG. 2 shows an advantageous, further development of a sensor element 1 of the invention. The sensor element 1 embodied such as shown in FIG. 1 is led into a support element 3. The support element 3 is especially manufactured of a metal material and is especially tubular. The sensor element 1 is led into the support element 3 to the extent that the contact pads 107 and ideally also a portion of the metal platelet 105 are located in the interior of the support element 3. Then, the interior of the support element 3 is completely cast with a potting compound 301. The supply wires 2, the contact pads 107, the seal, the part of the functional layer 102 not covered by the metal platelet 105, as well as the part of the metal platelet 105 located in the interior of the support element 3 are, thus, completely encased by the potting compound 301. In the case of immersion of the total sensor element 1 into the process medium, these elements are protected by the potting compound 301 against contact with the process medium.

Additionally, the free area of the substrate 101, which is not covered by the metal platelet 105, or parts of the free area of the substrate 101, thus those regions of the surface of the substrate 101, which are located adjoining the metal platelet 105 applied on the surface of the metal connecting layer 104, can receive a plastics layer 106. In this way, the metal connecting layer 104 is protected from the process medium, or when the metal platelet 105 has only the width of the functional layer 102, supplementally the edges of the layers located between the metal platelet 105 and the substrate 101, thus, the functional layer 102, the passivating layer 103 and the metal connecting layer 104, which could be contacted by the process medium.

The sensor element 1 of the invention embodied in such a manner offers a far more improved long term stability in comparison with conventional sensor elements in use with aggressive process media.

The sensor element 1 of the invention can be used in a large number of applications. Thus, it is, for example, provided to use the sensor element 1 as heating element or as temperature sensor in a thermal flow sensor.

The sensor element 1 can be embodied in such a manner that it can alternately heat the measured medium and measure the temperature of the measured medium. The decay of the temperature induced in the measured medium is, in such case, a measure for the flow velocity of the measured medium.

Alternatively, flow velocity of the measured medium can, in such case, be determined via measuring principles well known from the state of the art, such as, for example, the heated wire method, the constant temperature anemometer, or the heat up method, using at least two of the sensor elements 1 of the invention.

It is understood, however, that use of the sensor element of the invention is not limited to these examples. Thus, it is known to those skilled in the art that such a sensor element can be used in a large number of other applications.

The invention claimed is:

1. A sensor element for determining a physical, measured variable of a measured medium, the sensor element comprising:
   a planar substrate;
   a functional layer disposed on a surface of the substrate, wherein the functional layer is composed at least partially of platinum, nickel, palladium, a metal alloy or a doped material;
   a passivating layer disposed on the functional layer;
   a metal connecting layer disposed on the passivating layer such that the passivating layer is completely covered by the metal connecting layer; and
   a metal platelet disposed on the metal connecting layer such that no contact occurs between the passivating layer and the measured medium when the sensor element is placed in contact with the measured medium.

2. The sensor element of claim 1, further comprising a contact layer disposed between the passivating layer and the metal connecting layer, wherein the contact layer is adapted to enable application of the metal connecting layer on the passivating layer.

3. The sensor element of claim 2, further comprising a plastics layer disposed on areas of the surface of the substrate adjoining the metal platelet disposed on the metal connecting layer, wherein the plastics layer covers the contact layer such that no contact occurs between the contact layer and the measured medium when the sensor element is placed in contact with the measured medium.

4. The sensor element of claim 1, wherein the metal connecting layer is a solder layer.

5. The sensor element of claim 4, wherein the solder layer includes a tin solder.

6. The sensor element of claim 1, wherein the metal connecting layer is a sintered layer.

7. The sensor element of claim 6, wherein the sintered layer includes a silver sinter.

8. The sensor element of claim 1, wherein the passivating layer is composed essentially of glass.

9. The sensor element of claim 1, wherein the substrate is composed essentially of zirconium oxide, aluminum nitride or aluminum oxide.

10. The sensor element of claim 1, wherein the metal platelet is composed essentially of nickel, a nickel-chromium alloy, a stainless steel or a superalloy.

11. The sensor element of claim 1, further comprising contact pads disposed on a portion of the surface of the substrate adjoining the metal platelet on the metal connecting layer, the contact pads electrically connected with the functional layer, wherein supply wires are welded, bonded, soldered or electrically conductively adhered to the contact pads.

12. The sensor element of claim 11, wherein the sensor element is disposed within a support element such that the contact pads are located within the support element.

13. The sensor element of claim 12, wherein the support element is filled with a potting compound such that no contact occurs between the contact pads with the supply wires and the measured medium when the sensor element is placed in contact with the measured medium.

14. The sensor element of claim 13, wherein the potting compound includes an epoxide resin, silicone or glass.

15. The sensor element of claim 1, wherein the functional layer is configured as a metal layer with an electrical resistance and a temperature coefficient, which enable determining the temperature of the measured medium as the physical, measured variable based on a measured electrical resistance value.

16. The sensor element of claim 1, wherein the functional layer is configured as a metal layer with an electrical resistance, and wherein the sensor element is configured to heat the measured medium at least temporarily by a supplied electrical power to the functional layer.

17. A thermal flow sensor, comprising:
  at least two sensor elements, each sensor element comprising:
    a planar substrate;
    a functional layer disposed on a surface of the substrate, wherein the functional layer is composed at least partially of platinum, nickel, palladium, a metal alloy or a doped material;
    a passivating layer disposed on the functional layer;
    a metal connecting layer disposed on the passivating layer such that the passivating layer is completely covered by the metal connecting layer; and
    a metal platelet disposed on the metal connecting layer such that no contact occurs between the passivating layer and the measured medium when the sensor element is placed in contact with the measured medium,
  wherein at least one of the at least two sensor elements is configured as a heating element for heating the measured medium at least temporarily.

* * * * *